United States Patent [19]

Gerry

[11] 4,169,445

[45] Oct. 2, 1979

[54] TRANSIENT INTERMODULATION IGNITION SYSTEM

[76] Inventor: Martin E. Gerry, 13452 Winthrope St., Santa Ana, Calif. 92705

[21] Appl. No.: 878,792

[22] Filed: Feb. 17, 1978

Related U.S. Application Data

[63] Continuation-in-part of Ser. No. 868,118, Jan. 9, 1978.

[51] Int. Cl.² .......................... F02P 3/06; H05B 41/36
[52] U.S. Cl. ...................... 123/148 AC; 123/148 DS; 123/148 E; 315/209 CD
[58] Field of Search ................. 123/148 AC, 148 DS, 123/148 B, 148 E; 315/209 CD

[56] References Cited

U.S. PATENT DOCUMENTS

| | | | |
|---|---|---|---|
| 2,612,887 | 10/1952 | Mackay | 123/148 AC |
| 2,712,814 | 7/1955 | Harr | 123/148 B |
| 2,961,580 | 11/1960 | Harnden, Jr. | 123/148 AC |
| 3,165,099 | 1/1965 | Vanderpoel | 123/148 DS |
| 3,543,740 | 12/1970 | Vienat | 123/148 DS |
| 3,581,726 | 6/1971 | Plume, Jr. | 315/209 CD |
| 3,780,717 | 12/1973 | Rakitch | 123/148 AC |
| 3,897,767 | 8/1975 | Gordon et al. | 123/148 E |

FOREIGN PATENT DOCUMENTS

| | | | |
|---|---|---|---|
| 963525 | 2/1975 | Canada | 123/148 AC |
| 330879 | 6/1930 | United Kingdom | 123/148 DS |

*Primary Examiner*—Charles J. Myhre
*Assistant Examiner*—P. S. Lall

[57] ABSTRACT

A transient modulation ignition system is provided having a transformer with a primary winding and a secondary winding. A timer is utilized for intermittently providing ignition timing to the system. A non-DC power source is also provided the output of which is coupled to the primary winding for modulating the source output with energy stored in the primary winding. The secondary winding of the transformer feeds a conventional distributor which fires igniters to ignite the fuel in the engine.

11 Claims, 3 Drawing Figures

4,169,445

TRANSIENT INTERMODULATION IGNITION SYSTEM

RELATED PATENT APPLICATION

This application is a continuation-in-part of copending application Ser. No. 868,118, filed Jan. 9, 1978.

BACKGROUND OF THE INVENTION

This invention is in the field of ignition systems for fuel burning engines, and particularly in the area of transient modulation systems.

No prior art is known to exist in the field of transient modulation ignition systems.

SUMMARY OF THE INVENTION

A transient modulation ignition system is devised including a transformer with a primary winding and a secondary winding. The system includes first means for intermittently providing ignition timing to the system, a non-DC power source the output of which is coupled to the primary winding, and second means coupled to the power source and the first means for inhibiting flow of energizing power to the power source during a first mode of operation of the system and for feeding the energizing power to the power source during a second mode of operation of the system.

The primary winding is connected to the first means for enabling such winding to be charged during the first mode of operation and for also enabling the primary winding to be discharged during the second mode of operation.

Third means is included and coupled to the first means and the primary winding for enabling the primary winding to be charged during the first mode of operation and for enabling the primary winding to be discharged during the second mode of operation, such third means reducing current flow through the timer or first means.

A capacitor may be provided in series circuit with the output of the power source and the primary winding, or such capacitor may simply be shorted out or not included in the circuit so that the primary winding will be connected directly to an output terminal of the non-DC power source.

The first means may include a pair of contactors, one of said contactors being connected to the second means and the other of the contactors being at ground potential, and including a driven cam intermittently activating the contactors. Such first means may have a third contactor which is normally in cooperation with the contactor that is at ground potential, so that by cam action ground will alternately be shifted from said one of the contactors to the third contactor, such third contactor could be connected to the return side of the primary winding thereby avoiding the use of a transistor switch in the primary winding circuit.

The first means may optionally include an electrically conductive disk having a plural number of electrically insulative members regularly spaced about the periphery of the disk and integral therewith, and a contactor in cooperation with the periphery of the disk, the contactor being connected to the second means.

The primary winding provides a discharge current which intermodulates with a transient current provided by the power source during the second mode of operation, and modulation components resulting therefrom are induced into the secondary winding.

Functionally, the system operation may be summarized as follows:

Electrically charging a primary winding of an ignition transformer, energizing a non-DC power source and thereby providing transient power output therefrom, intermodulating power discharged from the primary winding with the transient power, and transferring resultant intermodulation products to a secondary winding of the ignition transformer and thence to a distributor.

The intermodulation step includes discharging the charged primary winding through a capacitor and through an output terminal of the power source thereby creating ringing power for intermodulating with the transient power, or feeding the output of the non-DC power source to the primary winding during the discharge period of the primary winding to intermodulate with the energy stored in the primary winding.

DETAILED DESCRIPTION

Figure 1:
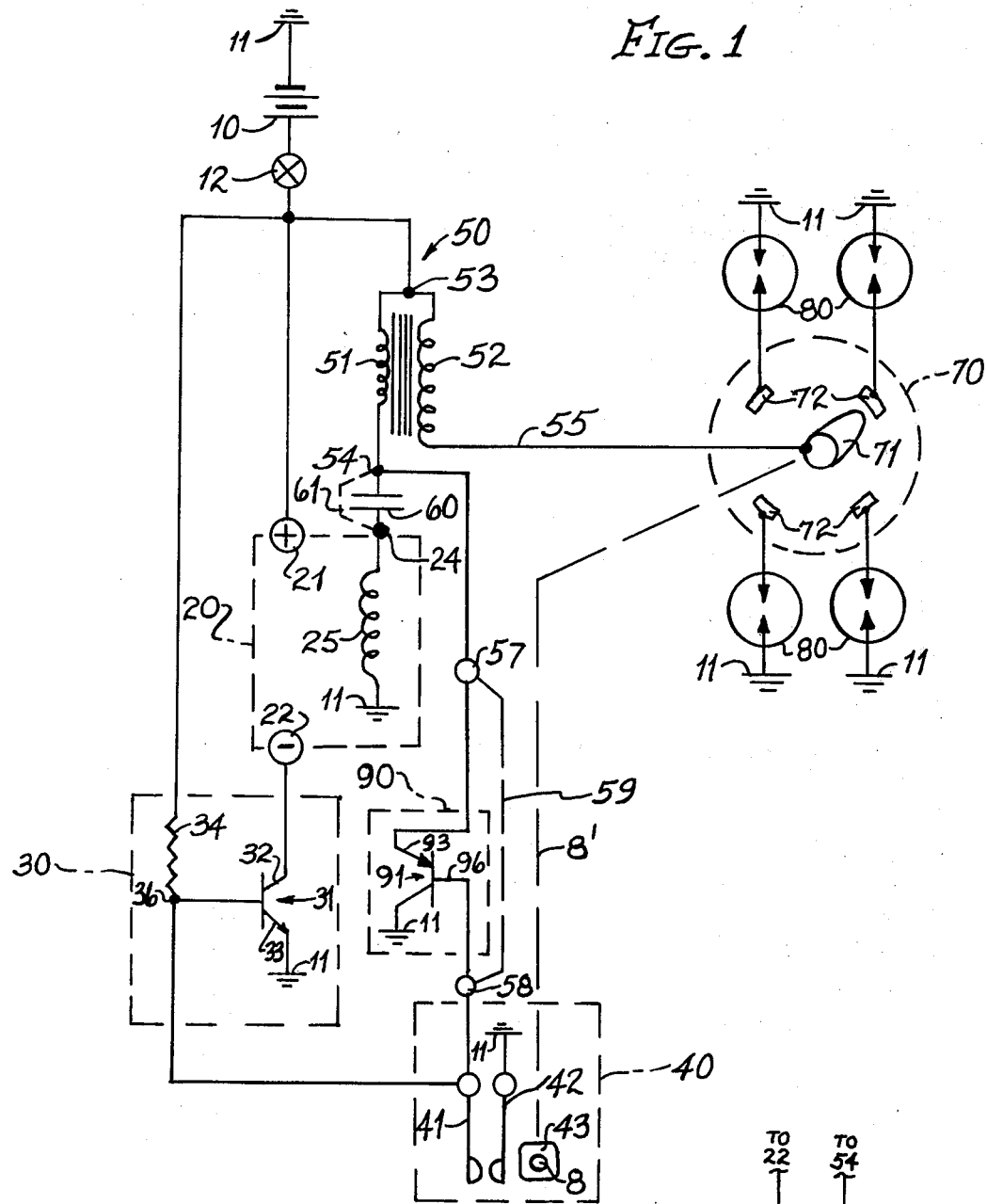
FIG. 1 is an electrical schematic of the ignition system according to the invention.
Figure 2:
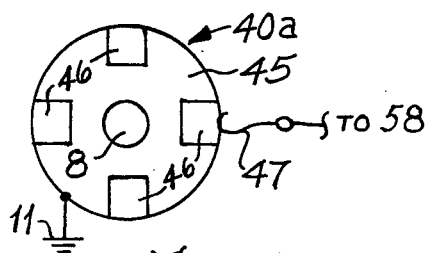
FIG. 2 is an optional timer, schematically represented, which may be used in lieu of the timer shown in FIG. 1.
Figure 3:
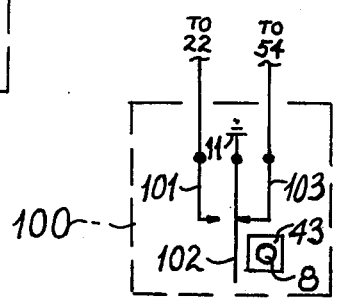
FIG. 3 is an optional simple timer, schematically represented, that can be used in lieu of the timers in FIG. 1 or 2.

Referring to the FIGURES, a transient modulation ignition system is provided for firing igniters in a fuel burning engine, wherein the engine has a distributor the driveshaft 8 thereof either driving a pair of contactors that are cam actuated or driving an electrically conductive disk, the disk and one of the contactors being at ground potential 11. Driveshaft 8 is also represented by mechanical coupling dotted line 8' showing the linkage between the distributor rotor and the driveshaft.

Ground symbol 11 therefore is throughout indicative of negative battery potential as well as the electrical return path for the system, and reference to ground return 11 will not generally be made hereinafter.

The positive side of battery 10 is connected through ignition switch 12 to apply positive DC power to terminal 21 of non-DC power source 20, which power source is generally a high power rectangular wave generator, to one end of resistor 34 of semiconductor 30 and to junction 53 of ignition transformer 50, which junction is conventionally a common terminal for the primary and secondary windings of transformer 50. Source 20 is of the type shown as Fig. 22 of Bulletin TC-101B and discussed at pages 45 and 46 of such bulletin entitled, Tape Wound Cores, published and copyrighted 1972 by Arnold Engineering Company of Marengo, Illinois.

Non-DC power source 20 will generally have a transformer output winding as at 25 for convenience of coupling the generally transient output therefrom to intermodulate with another transient produced by virtue of precharging primary 51 of transformer 50, to be later discussed.

Control circuit 30 is provided to intermittently cause negative DC from battery 10 to be applied to terminal 22 of power source 20, as keyed by timer 40 or 40a. Accordingly, circuit 30 as illustrated comprises an NPN high power transistor 31 wherein collector 32 is connected to negative terminal 22 of power source 20, emitter 33 to ground or negative DC, and the base connected at junction 36 to bias resistor 34, the other side of resistor 34 being connected to positive DC through switch 12.

Timers 40 or 40a are provided and either one may be optionally used. Timer 40 comprises a conventional set of ignition contactors 41 and 42 actuated by cam 43 which is driven by shaft 8. Contactor 41 is connected to junction 36 and contactor 42 is at ground potential 11. Accordingly, when the high portion of cam 43 cooperates with contactor 42, contactors 41 and 42 cooperate applying ground or negative DC potential to junction 36 or the base of transistor 31. Since transistor 31 is an NPN type, base current will not flow when the base is at a negative potential with respect to the emitter, and consequently in this first mode of operation collector current will also not flow during cooperation of contactors 41–42, and hence power source 20 will not be electrically energized.

However, when cam 43 is driven so as to break cooperation between contactors 41–42, the base will be at a positive potential with respect to emitter 33 and current will flow in this second mode of operation of the system to energize power source 20 with DC power by providing conduction between terminal 22 and ground due to flow of collector current, and thereby permit winding 25 to deliver non-DC output power.

In like manner, when timer 40a is utilized, disk 45 of electrically conductive material having electrically insulative members 46 regularly spaced at and integral with the periphery of the disk, generally one insulative member per one engine cylinder or one igniter, maintains contactor 47 in cooperation with the disk periphery. Hence, contactor 47 would be connected to junction 36 when this timer is used. Disk 45 being mounted on shaft 8 is at ground potential or negative DC potential, so that when contactor 47 cooperates with the electrically conductive portion of disk 45, negative DC is applied to junction 36 to maintain transistor 31 non-conducting, and when contactor 47 is in cooperation with insulative material 46 no negative DC is applied to junction 36 and junction 36 takes on the potential of the positive terminal of battery 10, as in the case of the use of timer 40. A positive DC potential at the base of transistor 31 will cause collector current to flow and hence power source 20 will be energized during that period, namely the second mode of operation of the system.

It should be noted that either timer 40 or 40a may be connected by means of jumper wire 59 between terminals 57 and 58, so that contactor 41 will be connected to terminals 57–58 and thence to junction 54 which is the return side of primary winding 51 of transformer 50. Junction 54 may have connected thereto capacitor 60 in series with output winding 25 of power source 20 at junction 24, or capacitor 60 may be optionally by-passed by means of jumper wire 61 conected between terminals 24 and 54. Where jumper wire 59 is used, then when cam 43 causes contactors 41 and 42 to cooperate, the system will be in its first mode of operation and primary 51 will be charged by battery 10. When cam 43 will cause contactors 41–42 to separate, negative DC power will be removed from primary 51, such circuit involving the primary winding will be placed in a state of unequilibrium and current from primary 51 will be discharged through capacitor 60, when jumper 61 is not used, and through winding 25. At the same time however, it has been shown that transistor 31 will conduct to switch on power source 20 and create a rectangular waveform preceded by a transient in winding 25. The current in winding 25 will intermodulate with the current due to discharge of primary 51, in primary 51, and induce a very high voltage into primary 51 which will be transformed into the secondary winding 53 by induction, thereby increasing the primary induced voltage as a product of such induced voltage and the transformer turns ratio to provide an extremely high voltage on wire 55 feeding rotor arm 71 of distributor 70. When rotor arm 71 is opposite one of the stationary members 72 of the distributor, the high potential at 71 will cause the particular igniter 80 connected to the particular stationary member in question, to fire.

Timer 40a will provide the foregoing described functions of timer 40 in similar manner, wherein contactor 47 will be connected to terminal 58 and junction 36, and act as contactor 41 would have acted, whereas disk 45 will provide periodic ground potentials to contactor 47 in similar manner as contactor 42 would have provided.

It is to be noted also, that when capacitor 60 is shunted out by jumper 61, the transient due to discharge of primary 51 will not be oscillatory or ringing type but rather will be a smoothly decaying exponential type to intermodulate with the transient produced at winding 25.

The foregoing description has not utilized any means for reducing current, due to charge of primary winding 51, in contactors 41–42 or members 45–47 of timers 40 or 40a respectively. To achieve this added benefit and hence prevent premature burn out of contactors, jumper wire 59 between terminals 57 and 58 is removed. This enables transistor switch 90 to become activated or deactivated by virtue of operation of either timer 40 or 40a. Timer 40 will be used to illustrate the function of switch 90 but it will be understood that timer 40a could have been also used with the same results. Hence, in the first mode of operation, when contactors 41–42 cooperate, base 96 of PNP transistor 91 will have a negative DC potential applied thereto. The PNP transistor requires its base to be more negative than its emitter in order for base current and hence collector current to flow. Accordingly, in this, the first mode of operation, collector current will flow between emitter 93 and the collector at ground potential of transistor 91, permitting primary 51 to be charged by DC power from battery 10. At the same time junction 36 will have a negative DC potential and no power will be provided to energize power source 20. When contactors 41–42 will break due to rotation of cam 43, ground 11 and hence the negative potential will be removed from both junction 36 and base 96. At this time, junction 36 will be at positive DC potential and consequently base 96 will also be at positive DC potential, causing power source 20 to be energized and causing collector current in transistor 91 to stop flowing. The energized power source 20 will deliver the rectangular wave output preceded by a transient at winding 25, and primary 51 will discharge creating its transient simultaneously with the transient in winding 25, to intermodulate in primary 51, as hereinabove described and deliver a high voltage to secondary winding 52.

It is to be noted that by virtue of the fact that modulation process is expressed by an infinite converging power series of the modulating components, that amplitude modulation products will be produced by virtue of the non-linearity characteristics of the ignition transformer 50, and particularly its iron core, to provide modulation products of the two components, namely the transient at 25 and the discharge transient in primary 51, which modulation products are greater in magnitude than the sum of the modulii of the two modulation components. Hence, such a modulation scheme provides extremely high voltages induced into the primary of the ignition transformer consequently further increased voltages transferred into the secondary of the transformer by transformer action, which normally would not be feasible by either the Kettering system by itself or by use of AC by itself to power the ignition transformer.

Timer 100 may be used whenever it is desired to simplify the circuit of FIG. 1. In such case, circuits 30 and 90, timer 40 together with jumper wire 59 as well as connection between resistor 34 and switch 12 may be removed. Instead, contactor 101 will be connected to terminal 22 of power source 20, and contactor 103 to junction 54. Movable contactor 102 will be at ground potential 11 and will be translated or moved by means of cam 43 driven by shaft 8. Functionally, the system utilizing timer 100 will be the same as when circuits 30 and 90 and either timer 40 or 40a were used. But with the use of this timer as a substitute although achieving simplicity, the contactors of the timer will have to be rated to carry high current levels, which high current levels were carried by the semiconductor circuits 30 and 90 when used with either timer 40 or 40a.

What is claimed is:

1. A transient modulation ignition system, including a transformer with a primary winding, said system having a first and a second mode of operation, comprising the combination of:

timing means electrically coupled to the primary winding for charging said primary winding during the first mode and for discharging said primary winding during the second mode;

AC means for generating AC power during the second mode, said AC means having an output terminal, said output terminal being electrically coupled to the primary winding;

a capacitor connected between said primary winding and output terminal, the discharge from the primary winding through the capacitor producing transient power; and switching means, connected to the AC means and coupled to the timing means, for inhibiting DC power from energizing the AC means during the first mode and for enabling DC power to be fed to the AC means during the second mode thereby activating the AC means so as to produce said AC power which intermodulates with the transient power in said primary winding.

2. The invention as stated in claim 1, including an electronic switch connected to the primary winding and coupled to the timing means.

3. The invention as stated in claim 2, wherein the timing means includes an electrically conductive disk having a plural number of electrically insulative members regularly spaced about the periphery of the disk and integral therewith, and a contactor in cooperation with said periphery, said contactor being connected to said electronic switch.

4. The invention as stated in claim 1, wherein the timing means includes a pair of contactors, one of said contactors being connected to the switching means and the other of said contactors being at ground potential.

5. The invention as stated in claim 1, wherein the timing means includes an electrically conductive disk having a plural number of electrically insulative members regularly spaced about the periphery of the disk and integral therewith, and a contactor in cooperation with said periphery, said contactor being connected to the switching means.

6. The invention as stated in claim 1, wherein the switching means is an electronic switch.

7. The invention as stated in claim 1, wherein the timing means comprises contactors and a driven cam which actuates said contactors, said contactors and cam also performing the function of the switching means.

8. A method for providing ignition power by AC modulation of transient power in a system having first and second modes of operation, comprising in combination the steps of:

(a) electrically charging a primary winding of an ignition transformer during the first mode and discharging said primary winding during the second mode;

(b) activating an AC power source during the second mode and thereby providing transient power output therefrom;

(c) intermodulating power discharged from the primary winding with the transient power fed to said primary winding during the second mode; and (d) transferring the power resulting from step (c) to a secondary winding of the ignition transformer.

9. The method as stated in claim 8, wherein step (a) includes feeding the primary winding with DC power during the first mode.

10. The method as stated in claim 8, wherein step (b) includes feeding DC power to the AC power source during the second mode.

11. The method as stated in claim 8, wherein step (a) includes discharging the charged primary winding through a capacitor and through an output terminal of the AC power source thereby creating ringing power for intermodulating with the transient power during said second mode.

* * * * *